US007483853B2

(12) United States Patent
Yamashita et al.

(10) Patent No.: US 7,483,853 B2
(45) Date of Patent: Jan. 27, 2009

(54) PROCUREMENT SYSTEM WHICH AUTOMATICALLY CALLS FOR BIDS ON PREDETERMINED SUBJECTS

(75) Inventors: Kiyoshi Yamashita, Tochigi-ken (JP); Yoshimi Akai, Tochigi-ken (JP); Mutsuo Innami, Tochigi-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1070 days.

(21) Appl. No.: 10/274,911

(22) Filed: Oct. 22, 2002

(65) Prior Publication Data

US 2003/0078876 A1    Apr. 24, 2003

(30) Foreign Application Priority Data

Oct. 22, 2001    (JP)    ............... 2001-324063

(51) Int. Cl.
G06Q 40/00    (2006.01)
(52) U.S. Cl. ............... 705/37; 705/36; 705/38; 700/99
(58) Field of Classification Search ............ 705/37, 705/36, 38; 700/99
See application file for complete search history.

(56) References Cited

U.S. PATENT DOCUMENTS 6,536,935 B2 *    3/2003    Parunak et al. ............... 700/99
7,096,197 B2 *    8/2006    Messmer et al. ............... 705/37

FOREIGN PATENT DOCUMENTS

| JP | 2000-113051 | 4/2000 |
|---|---|---|
| JP | 2001-266046 | 9/2001 |
| JP | 2001-350975 | 12/2001 |
| JP | 2001-356812 | 12/2001 |
| JP | 2002-32630 | 1/2002 |
| JP | 2002-41866 | 2/2002 |
| JP | 2002-63484 | 2/2002 |
| JP | 2002-183547 | 6/2002 |

OTHER PUBLICATIONS

Winner Determination in Multi-Attribute Auctions, IBM Research Report, RC22478 (W0206-018) Jun. 6, 2002.*
Multiple Attribute Design Evaluation of Complex Engineering Products Using the Evidential Reasoning Approach, Jian-Bo Yang et al., Journal of Engineering Design; Sep. 1997; 8, 3; Research Library, p. 211.*
An Experimental Analysis of Multi-Attribute Auctions, Martin Bichler, Decision Support Systems 29 (2000) 249-268.*

* cited by examiner

Primary Examiner—Harish T Dass
Assistant Examiner—Clifford Madamba
(74) Attorney, Agent, or Firm—Oblon, Spivak, McClelland, Maier & Neustadt, P.C.

(57) ABSTRACT

A procurement system for procuring a plurality of subjects, comprises a storage, a relation processor, a determining processor, and a bidding processor. The storage is configured to store information on a price, a function, and a quantity of each of the subjects. The relation processor is configured to obtain a relation between prices and functions of the subjects, based on the information stored in the storage. The determining processor is configured to determine a priority, for at least one of the subjects each of whose price is higher than a reference value which corresponds to the function of the each subject. The priority is obtained from the relation obtained by the relation processor. Further, the priority is determined based on the quantity of the each subject stored in the storage and a divergence between the price and the reference value of the each subject. The bidding processor is configured to automatically call for a bid on the at least one of the subjects in accordance with the priority determined by the determining processor.

8 Claims, 12 Drawing Sheets

2-A

| Bid/Purchase Determination Information Server |
|---|
| Field Name |
| Product ID |
| Parts Number |
| Parts Group |
| Parts Name |
| Manufacturer's Name |
| Model Name |
| Unit Price |
| Quantity |
| (Price by Regression Formula)-Δ |
| (Unit Price)-((Price by Regression.Formula)-Δ) |
| Bidding Determination (Y/N) |
| Bid Suppliers' Names |
| Bid Prices |
| Knock down Supplier's Name |
| Knock down Price |

| Bid/Purchase Info. Server |
|---|
| Field Name |
| Product ID |
| Parts Number |
| Parts Name |
| Rating 1 |
| Rating 2 |
| Rating 3 |
| Rating 4 |
| Rating 5 |
| Rating 6 |
| Rating 7 |
| Rating 8 |
| Rating 9 |
| Rating 10 |
| Comments |
| Bid Suppliers' Names |
| Bid Prices |

FIG.4

PROCUREMENT SYSTEM WHICH AUTOMATICALLY CALLS FOR BIDS ON PREDETERMINED SUBJECTS

CROSS-REFERENCE TO RELATED APPLICATION

This application is based upon and claims the benefit of priority from prior Japanese Patent Application No. P2001-324063, filed on Oct. 22, 2001, the entire content of which is incorporated herein by reference.

FIELD OF THE INVENTION

The present invention relates to a procurement system and a method of procurement, which analyze the price, the function, the quantity, and so on of subjects to be purchased, on the basis of information on the subjects, purchase plans of the subjects and further of information of receipt of order for products requiring the subjects and of producing the products. The system and the method further call for bids on a part of the subjects and purchases the subjects on the basis of a result of the analysis.

BACKGROUND OF THE INVENTION

Many companies usually try to reduce procurement cost. To be cost effective, some consider a method of evaluating parts information of a plurality of suppliers, and setting up various conditions. This is, for example, disclosed in the Japanese Patent Application Disclosure No. 2000-113051.

Further, the electronic bid system is known to electronically call for bids. The electronic bidding using this system is performed with connection, through communications, such as the Internet, to an information processing apparatus, operated by a bid host. Additionally, the electronic bidding is also performed with a connection to information processing apparatuses operated by bid participants.

Such an electronic bid system is not only used for dealings between individuals, but can be used for dealings between companies (usually bid hosts) and suppliers (usually bid participants). Using such a system, a performance-function value may be calculated based on a difference from a bid host's expectation (desired values) about, for example, functions, prices, and delivery dates of each bid participant's parts, and the bid host orders parts of which the calculated value becomes the minimum. This is for example, disclosed in the Japanese Patent Application Disclosure No. 2001-266046.

However, when trying to cost effectively use the electronic bid system for dealings between companies and suppliers (that is, for a bid and purchase of parts between the companies and the suppliers), the companies had to analyze information on the parts and prices, information on receiving an order for products requiring the parts, and information producing the products. Only then can the system cost effectively call for bids on one of the parts and purchase them.

In the conventional electronic bid system, a bid host had to consider each of the above information separately since there was no technique of collectively judging or analyzing information, such as the above mentioned information related to the parts, prices, receipt of order for products requiring the parts and to producing the products, when, for example, parts to be called for bids are selected. Therefore, it was difficult to collectively judge and analyze such information and to cost-effectively purchase the parts.

Moreover, it requires a lot of work to consider the information, such as the parts information, price information, information of receipt of orders for products requiring the parts, information of producing the products, and so on. This is especially true when many kinds of parts have to be called for bids on. In such a situation, an operator of a bid host may be engaged in a lot of work and it may lead to problems of failing to call for bids on necessary parts and/or of mistakenly calling for bids on unnecessary parts.

Furthermore, in the conventional electronic bid system, much time and effort was required to consider the above conditions since there was no technique of statistically analyzing the bid conditions (bidding quantity, bidding price, etc.) in a market about the parts to be called for bids and to be purchased.

BRIEF SUMMARY OF THE INVENTION

According to a first aspect of the present invention, there is provided a procurement system for procuring a plurality of subjects, which comprises a storage configured to store information on a price, a function, and a quantity of each of the subjects, a relation processor configured to obtain a relation between prices and functions of the subjects, based on the information stored in the storage, a determining processor configured to determine a priority, for at least one of the subjects each of whose price is higher than a reference value which corresponds to the function of the each subject and which is obtained from the relation obtained by the relation processor, wherein the priority is determined based on the quantity of the each subject stored in the storage and a divergence between the price and the reference value of the each subject, and a bidding processor configured to automatically call for a bid on the at least one of the subjects in accordance with the priority determined by the determining processor.

According to a second aspect of the present invention, there is provided a method of procuring a plurality of subjects in a system which has a storage configured to store information on a price, a function, and a quantity of each of the subjects, which comprises steps of obtaining a relation between prices and functions of the subjects, based on the information stored in the storage, determining a priority, for at least one of the subjects each of whose price is higher than a reference value which corresponds to the function of the each subject and which is obtained from the relation obtained in the obtaining step, wherein the priority is based on the quantity of the each subject stored in the storage and a divergence between the price and the reference value of the each subject, and automatically calling for a bid on the at least one of the subjects in accordance with the priority determined in the determining step.

According to a third aspect of the present invention, there is provided a computer program product on which is stored a computer program for procuring a plurality of subjects in a system which has a storage configured to store information on a price, a function, and a quantity of each of the subjects, the computer program having instructions, which when executed perform steps comprising obtaining a relation between prices and functions of the subjects, based on the information stored in the storage, determining a priority, for at least one of the subjects each of whose price is higher than a reference value which corresponds to the function of the each subject and which is obtained from the relation obtained in the obtaining step, wherein the priority is based on the quantity of the each subject stored in the storage and a divergence between the price and the reference value of the each subject, and automatically calling for a bid on the at least one of the subjects in accordance with the priority determined in the determining step.

According to a fourth aspect of the present invention, there is provided a procurement system for procuring a plurality of subjects, which comprises a storage configured to store information related to the subjects, a calculating processor configured to perform a statistical calculation with the information stored in the storage, a determining processor configured to determine whether to call for a bid on or to order each of the subjects, based on the statistical calculation by the calculating processor, and a bid/order processor configured to call for the bid on or ordering each of the subjects, based on the determination by the determining processor.

According to a fifth aspect of the present invention, there is provided a procurement system for procuring a plurality of series of subjects, which comprises a storage configured to store information related to the series, a calculating processor configured to perform a statistical calculation with the information stored in the storage, a determining processor configured to determine whether to call for a bid on or to order each of the series, based on the calculation by the calculating processor, and a bid/order processor configured to call for the bid on or to order each of the series, based on the determination by the determining processor.

According to a sixth aspect of the present invention, there is provided a procurement system for procuring a plurality of subjects each of which having a different function, which comprises a storage configured to store information related to the subjects, a computing processor configured to obtain a relation expression of between functions and prices of the subjects based on the information stored in the storage, and a preparing processor configured to prepare a chart showing a distribution of the subjects based on the relation expression regarding of price and function.

BRIEF DESCRIPTION OF THE DRAWINGS

A more complete appreciation of embodiments of the present invention and many of its attendant advantages will be readily obtained by reference to the following detailed description considered in connection with the accompanying drawings, in which:

FIG. 3 is an example showing a list of information stored and managed in a bid/purchase determination information server 2-A according to the first embodiment of the present invention;

FIG. 4 is an example showing a list of information stored and managed in a bid/purchase information server 3-A according to the first embodiment of the present invention;

DETAILED DESCRIPTION OF THE PREFERRED EMBODIMENTS

Embodiments of the present invention will be described with reference to the accompanying drawings.

In the following description of preferred embodiments of the present invention, a procurement system may be used, for example, by manufacturing companies as bid hosts who call for one or more bids on and purchase parts and members (or collectively and generally referred to as subjects) (hereinafter referred to as parts). Further, calling for bids on and purchase of parts may represent activities related to procurement of parts in the following embodiments of the present invention. More specifically, it may represent activities that a company or an entity, who would like to procure parts, calls for bids on parts and receives bids from parts suppliers, and accordingly sends orders for the parts to one or more successful bidder(s) so as to purchase the parts.

First Embodiment (System Configuration)

Figure 1:
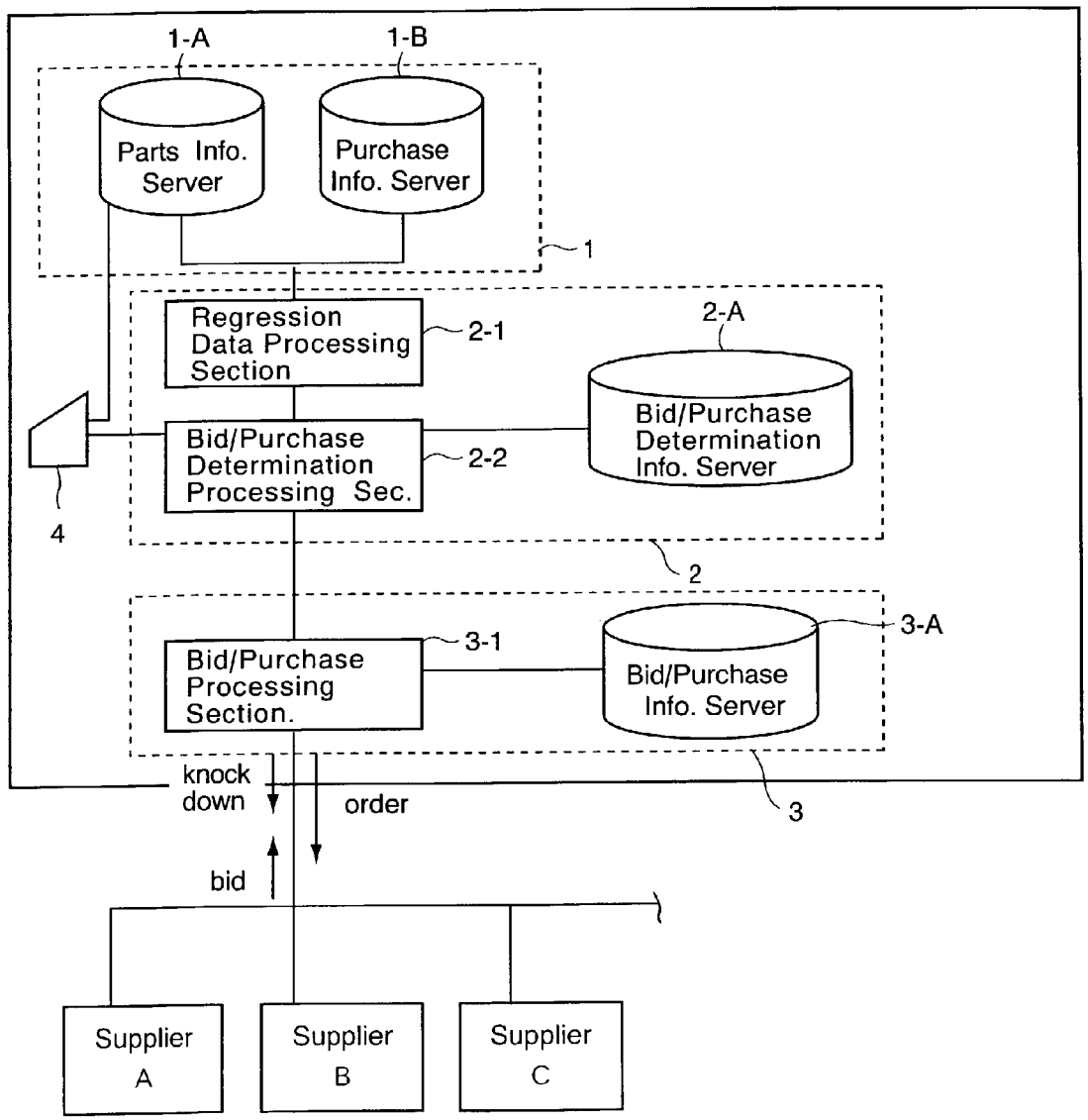
FIG. 1 is a block diagram showing a procurement system according to a first embodiment of the present invention.

A configuration of a procurement system according to a first embodiment of the present invention will be explained. FIG. 1 is a block diagram showing the procurement system according to the first embodiment of the present invention. As shown in FIG. 1, the procurement system mainly comprises a server 1, a bid/purchase determination system 2, a bid/purchase system 3, and an input section 4.

The server 1 may include a parts information server 1-A which stores and manages parts information and a purchase information server 1-B which stores and manages purchase information. The bid/purchase determination system 2 may include a bid/purchase determination information server 2-A which stores and manages bid/purchase determination information, a regression data-processing section 2-1 which performs regression data-processing based on the information stored in the server 1, and a bid/purchase determination processing section 2-2 which determines whether to bid or purchase based on a processing result by the regression data-processing section 2-1 and the information stored in the bid/purchase determination information server 2-A. The bid/purchase system 3 may include a bid/purchase information server 3-A which stores and manages bid/purchase information and a bid/purchase processing section 3-1 which automatically electronically calls for one or more bids on parts and performs purchase processing based on a determination result by the bid/purchase determination system 2 and the information stored in the bid/purchase information server 3-A. The input section 4 may include a keyboard and a mouse.

In the illustrated embodiment, the above described systems and servers are connected with one another through the Internet. Further, the procurement system described above may also be connected, through the Internet Web, with parts suppliers A, B, C, and so on who may electronically participate in the bidding. Each parts supplier may, for example, receive a bidding chance by email or any other way in advance from an end of the procurement system and accordingly be able to participate in the bidding.

Figure 2:
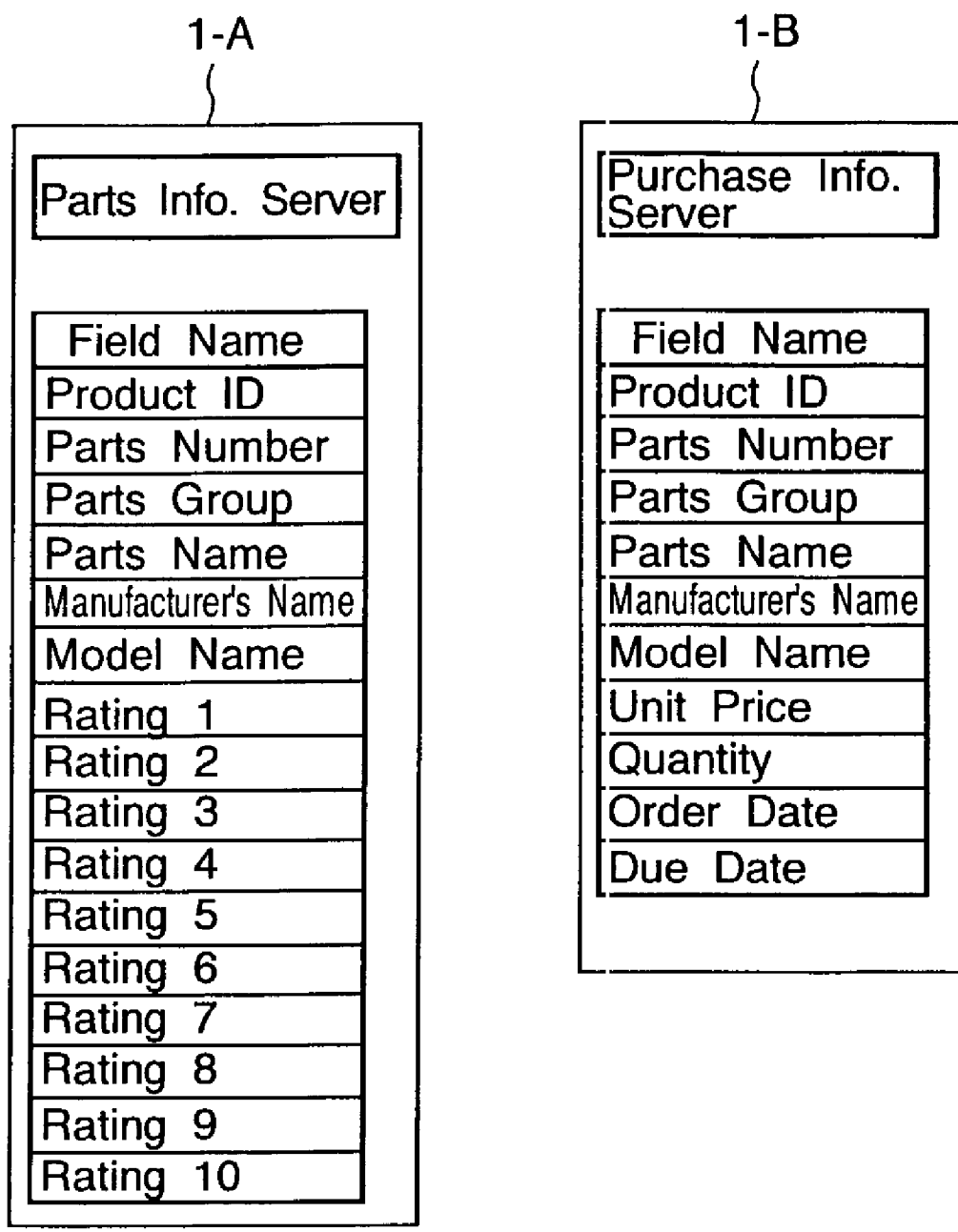
FIG. 2 is an example showing lists of information stored and managed in a server 1 according to the first embodiment of the present invention.

FIG. 2 is an example showing lists of information stored and managed in the server 1 according to the first embodiment of the present invention. As shown in FIG. 2, the parts information server 1-A may store and manage, for example, a product ID, a parts number, a parts group, a parts name, a manufacturer's name, a model name by the manufacturer, functional ratings (10 ratings or functions, for example), and the like, for each unit of parts. Such information may be input by the input section 4 to the parts information server 1-A. The purchase information server 1-B may store and manage, for example, a product ID, a parts number, a parts group, a parts name, a manufacturer's name, a model name by the manufacturer, a unit price, quantity, an order date, a due date, and the like, for each unit of parts. Such information may be collected from other system to the purchase information server 1-B.

Similarly, FIG. 3 is an example showing a list of information stored and managed in the bid/purchase determination information server 2-A according to the first embodiment of the present invention. As shown in FIG. 3, the bid/purchase determination information server 2-A may store and manage, for example, a product ID, a parts number, a parts group, a parts name, a manufacturer's name, a model name by the manufacturer, a unit price, quantity, a mathematical formula (e.g., (a price obtained by a regression formula)–Δ), another mathematical formula (e.g., (a unit price)–((a price obtained by a regression formula)–Δ)), bidding determination (threshold of Yes/No), bid suppliers' names, bid prices, a knock down supplier's name, a knock down price, and so on, for each unit of parts. The Δ will be explained later.

Still further, FIG. 4 is an example showing a list of information stored and managed in the bid/purchase information server 3-A according to the first embodiment of the present invention. As shown in FIG. 4, the bid/purchase information server 3-A may store and manage, for example, a product ID, a parts number, a parts name, ratings (10 ratings, for example), comments, bid suppliers' names, bid prices and the like, for each unit of parts.

(Method of Calling for Bids on and Purchasing Parts)

Next, procedures of calling for bids on parts and purchasing the parts in the procurement system according to the first embodiment of the present invention will be explained with reference to FIG. 5. First, the bid/purchase determination system 2 performs processing for obtaining a correlation (a type of relation between one or more functions (ratings) and prices) which becomes a basis to determine on which parts should be called for bids.

The regression data-processing section 2-1 takes in material parts information (ratings 1-10), which is important for determining a price, from the parts information server 1-A for each kind of parts, and takes in the price information of corresponding parts and the like from the purchase information server 1-B. To be specific, when a motor is taken as an example, data regarding an output (W) or a torque (Nm) may be taken in as the prime function (rating) and its price data may be taken in as the parts price information.

The regression data-processing section 2-1 performs conventional regression data processing. The regression data-processing section 2-1 calculates and obtains an operational expression (hereinafter referred to as correlation expression) which represents an optimal correlation, by performing correlation analyses (such as a multiple regression, a single regression, and spline approximation) based on the above mentioned data.

The above mentioned procedures will be explained more specifically below with an example of a direct current constant voltage power supply as the subject part.

The regression data-processing section 2-1 takes in data of the output power about the direct current constant voltage power supply as the material function information (ratings 1-10), and takes in its price data (as the price), and quantity information. Accordingly, the regression data-processing section 2-1 calculates and obtains an optimal correlation expression, by performing correlation analyses (such as a multiple regression, a single regression, and spline approximation) based on the taken in data.

Figure 5:
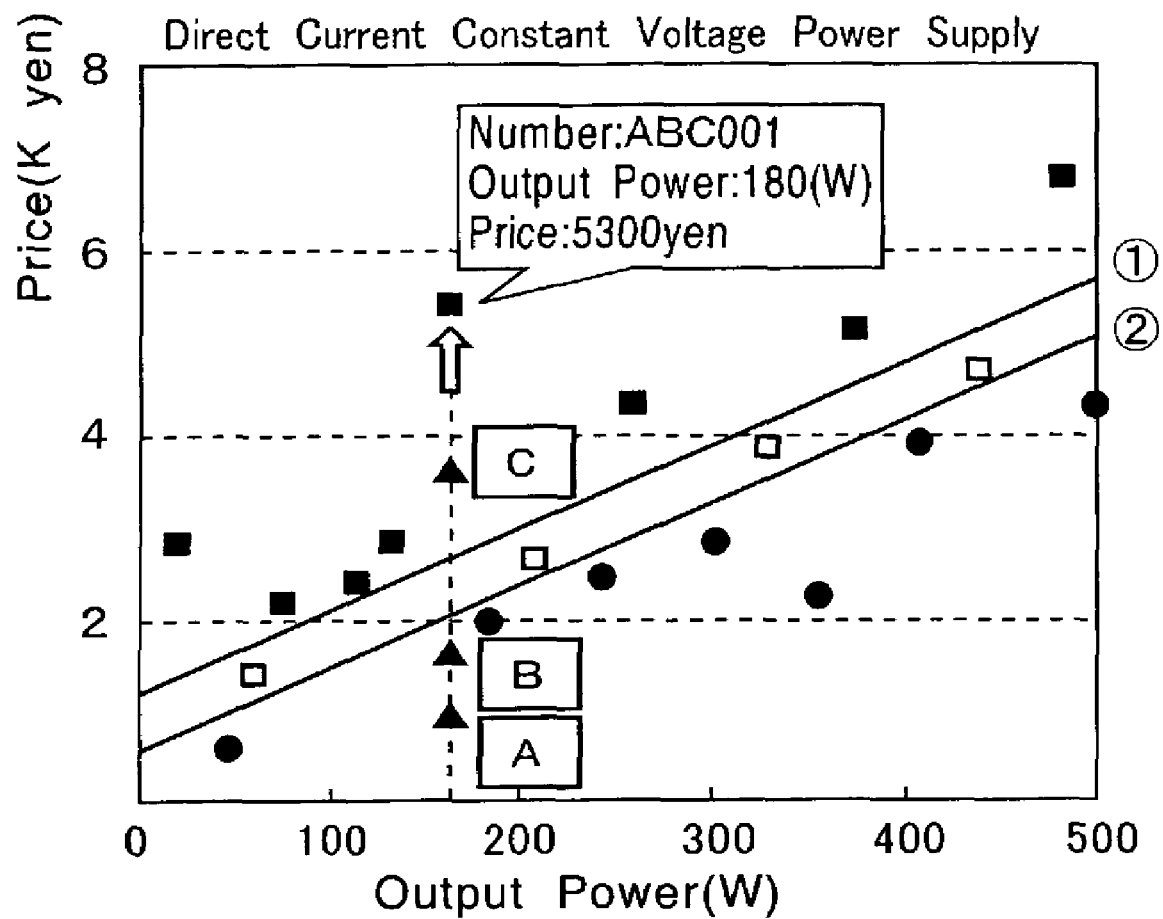
FIG. 5 is a chart showing an example of a correlation expression according to the first embodiment of the present invention.

FIG. 5 is a chart showing an example of the correlation expression mentioned above. In FIG. 5, the vertical axis represents a rating (output power (W)) and a horizontal axis represents a price (a thousand yen). The correlation expression is represented by a line ①. Each plot (■, □, ●) represents each parts' data which has become a basis for obtaining the correlation expression. The plot pointed by an arrow, for example, represents data of the part having a parts number 'ABC001', an output power '180 (W)', and a price '5300 yen'. The line ②, on the other hand, represents a correlation expression obtained by correcting the line ① with a predetermined reference value Δ subtracted from each value (price) of the line ①. The reference value Δ may be a value for determining (correcting) a scope of prices to be a reference for determining whether it is necessary to call for bids or not. The reference value Δ can be set as an operator likes in consideration with the kind of parts, a market trend, and so on. In FIG. 5, plots placed between the line ① and the line ② are represented with □. Plots placed below the line ② are represented with ●. Plots placed above the line ① are represented with ■. When the reference value Δ is zero, the line ② becomes the same as the correlation expression (the line ①). The reference value Δ may be stored and managed in the bid/purchase determination information server 2-A.

The bid/purchase determination processing section 2-2 may determine to call for bids on parts, indicated with the plots above the line ②. Here the line ② is a reference for determining whether to call for bids or not. The plots above the line ② are represented with the plots ■ and □ in FIG. 5. Only when the reference value Δ is set to zero, parts indicated with only plots ■ are determined to be called for bids.

When there is a limitation for the number of parts which can be called for bids, it may be preferable to give priorities to call for bids on the limited number of parts. For example, it may be helpful for a company to treat the limited number of parts as an established reference number of how many parts can be called for bids on each time. Further, for example, it may be helpful for the company to establish a threshold value where prospective profit resulting from a cost reduction according to bidding results is more than an amount represented with the threshold value in each parts. In such a situation, the company may decide to call for bids on only such profitable parts. Accordingly, the company can get the most out of the limited number of chances to call for bids on parts, and effectively achieve a cost reduction in the parts procurement. The reference number or the threshold may be determined in advance, or may be set and changed at any time with the input section 4 by the operator.

Regarding parts (for example, the parts pointed by an arrow in FIG. 5) which have been determined to be called for bids on, the bid/purchase determination processing section 2-2 sends their parts' information (rating) to the bid/purchase system 3. The bid/purchase system 3 which received the information from the bid/purchase determination processing section 2-2 calls for bids on the parts. Here, the parts to be called for bids by the bid/purchase system 3 can be any parts which satisfy functions or specifications (or rating) (for example, output power: 180 (W)) of the parts which have been determined to be called for bids. Each of the parts suppliers A, B, C, . . . may participate in such bidding through the Internet. As explained above, what is called for bids may usually be for functions or specifications (or ratings) of the parts which has been determined to be called for bids and a plurality of parts suppliers may be allowed to participate in the bidding. However, the parts itself can also be called for bids.

When the procurement system calls for bids on the parts, a result of bidding (such as bid offers) by the parts suppliers A, B, C, . . . may be reported to the bid/purchase processing section 3-1. An example of the bidding report is shown in FIG. 5. Plots ▲ represent results of bidding by the parts suppliers A, B, and C. As this example shown in FIG. 5, the bidding results may be displayed together on a chart based on the correlation expression.

The bid/purchase processing section 3-1 compares bidding prices of the parts suppliers A, B, and C with one another, and determines to knock down or select the parts supplier A since the parts supplier A has presented the lowest price among the bidding suppliers within the same or similar functions (ratings) called for bids. The bid/purchase processing section 3-1 orders the parts presented in the bidding to the parts supplier A.

While the bidding is taken place, the bid/purchase determination processing section 2-2 determines to order predetermined parts without calling for bids on them. Such parts may be those represented with the plots ● which are below the line ② in FIG. 5. These parts may usually be parts which the company has already been purchasing as acceptable priced parts. Therefore, these parts may not be for those to be called for bids and may be continuously purchased automatically.

Regarding these parts determined not to be called for bids, the bid/purchase determination processing section 2-2 sends their parts' information, such as ratings 1-10, to the bid/purchase system 3. Responsive to the information, the bid/purchase system 3 automatically purchases (orders) these parts. The order may be placed to the parts suppliers A, B, C, . . . connected through the Internet.

Charts showing correlation expressions or the like, such as the chart shown in FIG. 5 may be displayed in a display such as a monitor. Correlation expressions calculated and obtained by the regression data-processing section 2-1 may be displayed in a form of charts or tables. Therefore, the arrow shown in FIG. 5 can be a cursor, and, responsive to moving the cursor to each parts plot, a corresponding parts information may be displayed as, for example, 'parts number: ABC001; output power: 180 (W); price: 5300 yen'.

In addition, parts price information stored and managed in the purchase information server 1-B and the bid/purchase determination information server 2-A may be updated in real time by automatically transferring a past purchase record, bidding information, and so on.

Further, when the bid/purchase system 3 calls for bids on parts, the correlation expressions such as shown in FIG. 5 or tables as well as the parts information (ratings 1-10) may also be provided to the parts suppliers A, B, C, . . . via the bid/purchase system 3, according to the company (or whoever calls for bids on parts).

According to the procurement system of the first embodiment of the present invention, as explained above, an optimal price for each parts (values represented by the correlation expression) can be obtained based on the collective determination of parts (determination of the correlation between functions and prices). Accordingly, as for a predetermined parts function (rating), parts which are more expensive than the obtained optimal price may be automatically called for bids on, and parts which are cheaper than the obtained optimal price may be automatically purchased (ordered).

Second Embodiment

A procurement system according to a second embodiment of the present invention includes functions covering the procurement system according to the first embodiment of the present invention. Specifically, in addition to functions included in the procurement system according to the first embodiment of the present invention, the second embodiment of the present invention has a function which calls for bids on predetermined parts with priorities. The predetermined parts may be effectively reduced in their prices, according to a collective determination of a correlation analysis result between purchase prices and purchase quantity, and a necessary quantity calculated on the basis of information of receipt of orders for products requiring the parts and information of producing the products.

(System Configuration)

Figure 6:
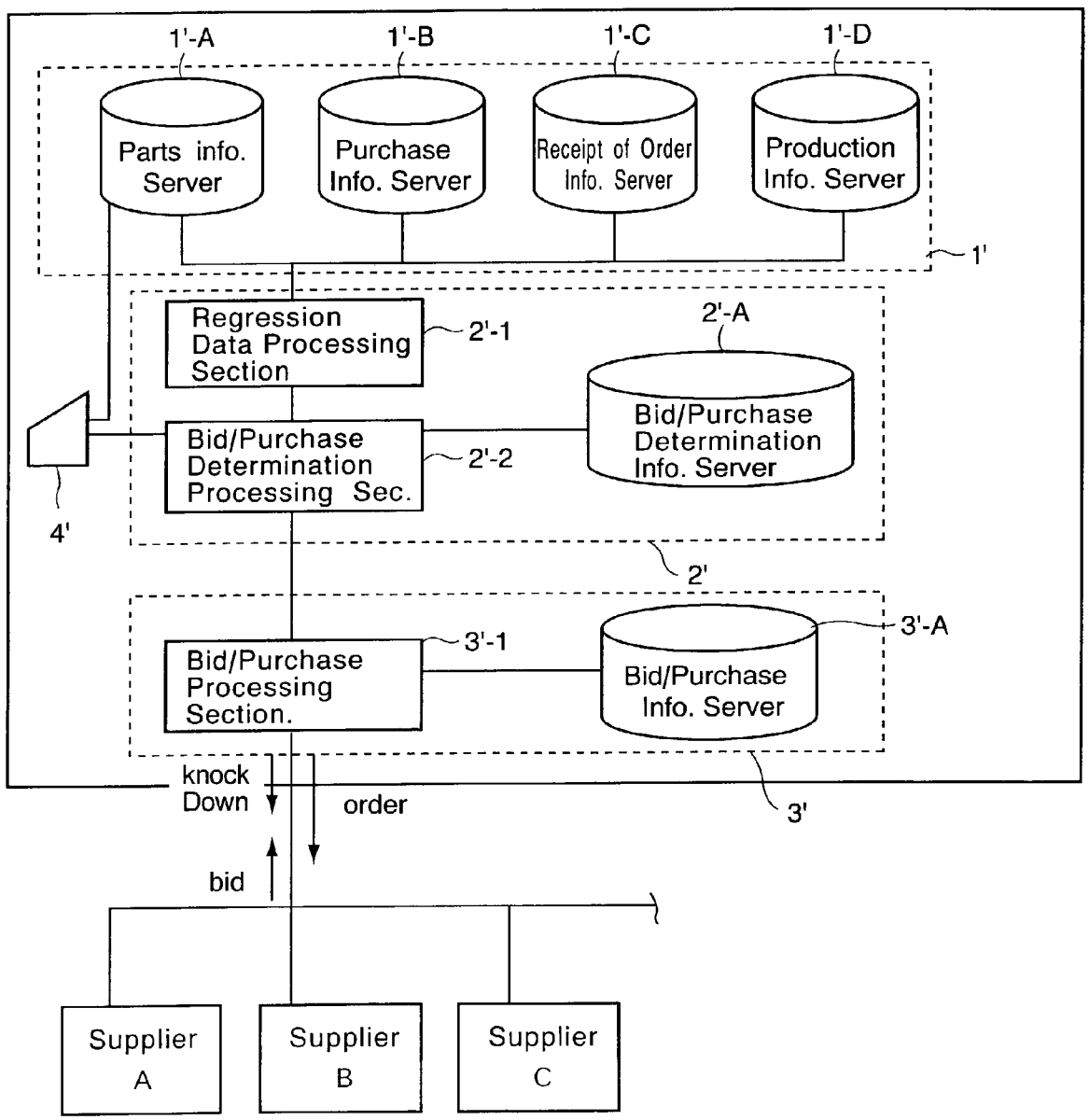
FIG. 6 is a block diagram showing a procurement system according to a second embodiment of the present invention.

A configuration of the procurement system according to the second embodiment of the present invention will be explained. FIG. 6 is a block diagram showing the procurement system according to the second embodiment of the present invention. As shown in FIG. 6, the procurement system mainly comprises a server 1', a bid/purchase determination system 2', a bid/purchase system 3', and an input section 4'.

The server 1' may include a parts information server 1'-A, a purchase information server 1'-B, a receipt of order information server 1'-C, and a production information server 1'-D. The bid/purchase determination system 2' may include a bid/purchase determination information server 2'-A which stores and manages bid/purchase determination information, a regression data-processing section 2'-1 which performs regression data-processing based on the information stored in the server 1', and a bid/purchase determination processing section 2'-2 which determines whether bids or purchases based on a processing result by the regression data-processing section 2'-1 and the information stored in the bid/purchase determination information server 2'-A. The bid/purchase system 3' may include a bid/purchase information server 3'-A which stores and manages bid/purchase information. The system 3' may also include a bid/purchase processing section 3'-1 which automatically and electronically calls for one or more bids on parts and performs purchase processing based on a determination result by the bid/purchase determination system 2' and the information stored in the bid/purchase information server 3'-A. The input section 4' may include a keyboard and a mouse.

The above described systems and servers are connected with one another through the Internet. Further, the procurement system described above may also be connected, through the Internet, with parts suppliers A, B, C, who may electronically participate in the bidding. Each parts supplier may; for example, receive a bidding chance by email or any other way in advance from an end of the procurement system and accordingly be able to participate in the bidding.

Figure 7:
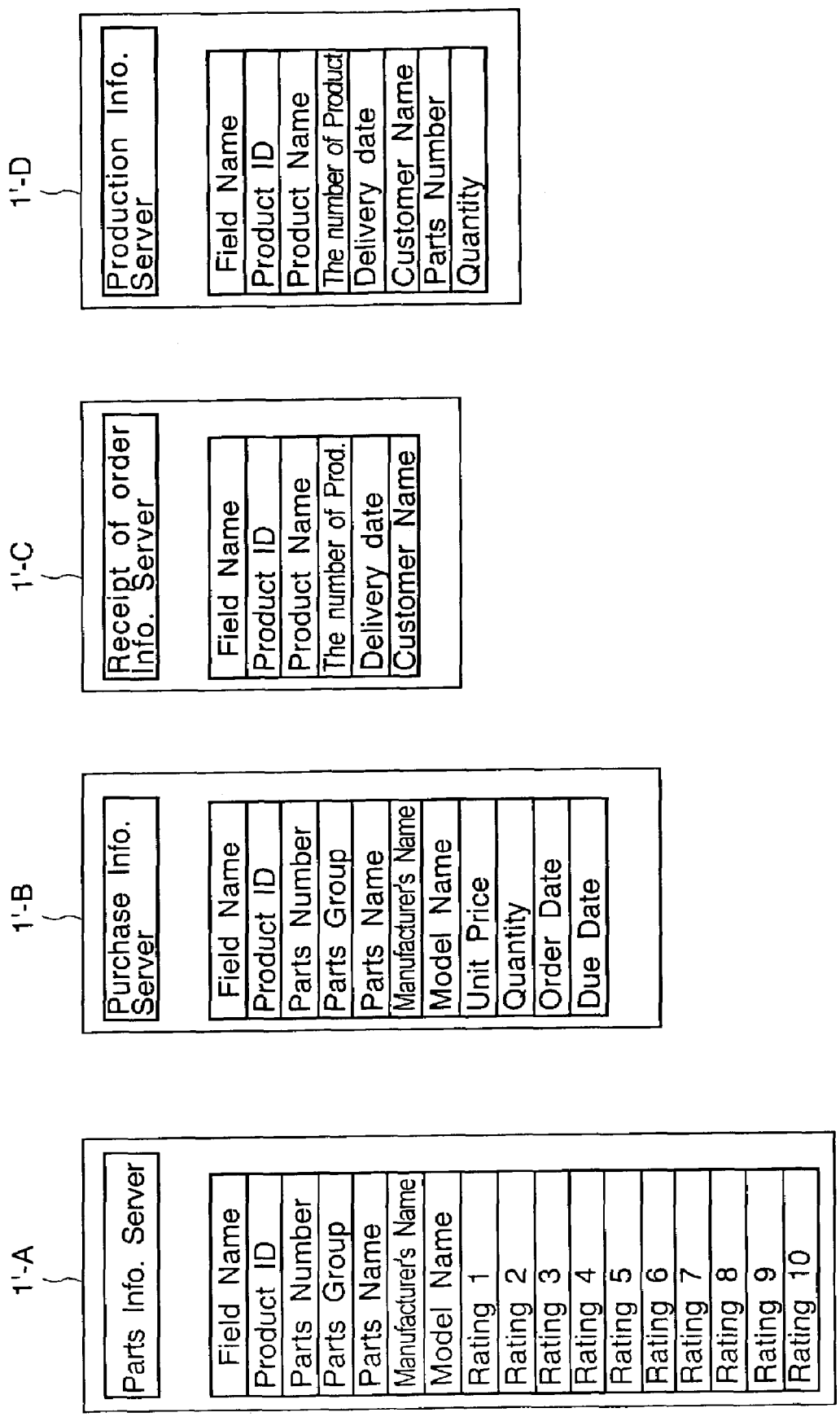
FIG. 7 is an example showing lists of information stored and managed in a server 1' according to the second embodiment of the present invention.

FIG. 7 is an example showing lists of information stored and managed in the server 1' (servers 1'-A-1'-D). As shown in FIG. 7, the parts information server 1'-A may store and manage, for example, a product ID, a parts number, a parts group, a parts name, a manufacturer's name, a model name by the manufacturer, ratings (10 ratings, for example), and the like, for each unit of parts. Such information may be input by the input section 4' to the parts information server 1'-A. The purchase information server 1'-B may store and manage, for example, a product ID, a parts number, a parts group, a parts name, a manufacturer's name, a model name by the manufacturer, a unit price, quantity, an order date, a due date, and the like, for each unit of parts. Such information may be collected from other systems to the purchase information server 1'-B. Further, the receipt of order information server 1'-C may store and manage, for example, a product ID, a product name, the number of the product, a delivery date, a customer's name, and the like. These information may be automatically collected from other components. Still further, the production information server 1'-D may store and manage, for example, a product ID, a product name, the number of the product, a delivery date, a customer's name, a parts number, quantity, and the like. These information may also be automatically collected from other components.

Applying FIG. 3 correspondingly, FIG. 3 is an example showing a list of information that may be stored and managed in the bid/purchase determination information server 2'-A. As shown in FIG. 3, the bid/purchase determination information server 2'-A may store and manage, for example, a product ID, a parts number, a parts group, a parts name, a manufacturer's name, a model name by the manufacturer, a unit price, quantity, a mathematical formula (e.g., (a price obtained by a regression formula)−Δ), another mathematical formula (e.g., (a unit price)−((a price obtained by a regression formula)−Δ)), bidding determination (threshold of Yes/No), bid suppliers' names, bid prices, a knock down supplier's name, a knock down price, and so on, for each unit of parts.

Still further, applying FIG. 4 correspondingly, FIG. 4 is an example showing a list of information that may be stored and managed in the bid/purchase information server 3'-A. As shown in FIG. 4, the bid/purchase information server 3'-A may store and manage, for example, a product ID, a parts number, a parts name, ratings (10 ratings, for example), comments, bid suppliers' names, bid prices and the like, for each unit of parts.

(Method of Calling for bids on and Purchasing Parts)

Next, procedures of calling for bids on parts and purchasing the parts in the procurement system according to the second embodiment of the present invention will be explained with reference to FIG. 8. First, the bid/purchase determination system 2' performs processing for obtaining a correlation (a type of relation between one or more functions (ratings), prices, and quantity: price reduction effect) which becomes a basis to determine on which parts should be called for bids. The regression data-processing section 2'-1 takes in material parts information (ratings 1-10) which determines a price from the parts information server 1'-A for each kind of parts, and takes in the price information of corresponding parts. and the like from the purchase information server 1'-B. Further, the regression data-processing section 2'-1 takes in information of the number of a product, requiring the parts, for which orders have been received, from the receipt of order information server 1'-C. Still further, the regression data-processing section 2'-1 takes in information of the number of the product to be produced from the production information server 1'-D.

The regression data-processing section 2-1 performs conventional regression data processing. The regression data-processing section 2-1, for example, calculates and obtains the purchase quantity from the information from the receipt of order information server 1'-C and the production information server 1'-D. Accordingly, the regression data-processing section 2-1 calculates and obtains an optimal correlation expression between purchase prices of the parts and the purchase quantity, by performing correlation analyses, such as a multiple regression, a single regression, and spline approximation.

Figure 8:
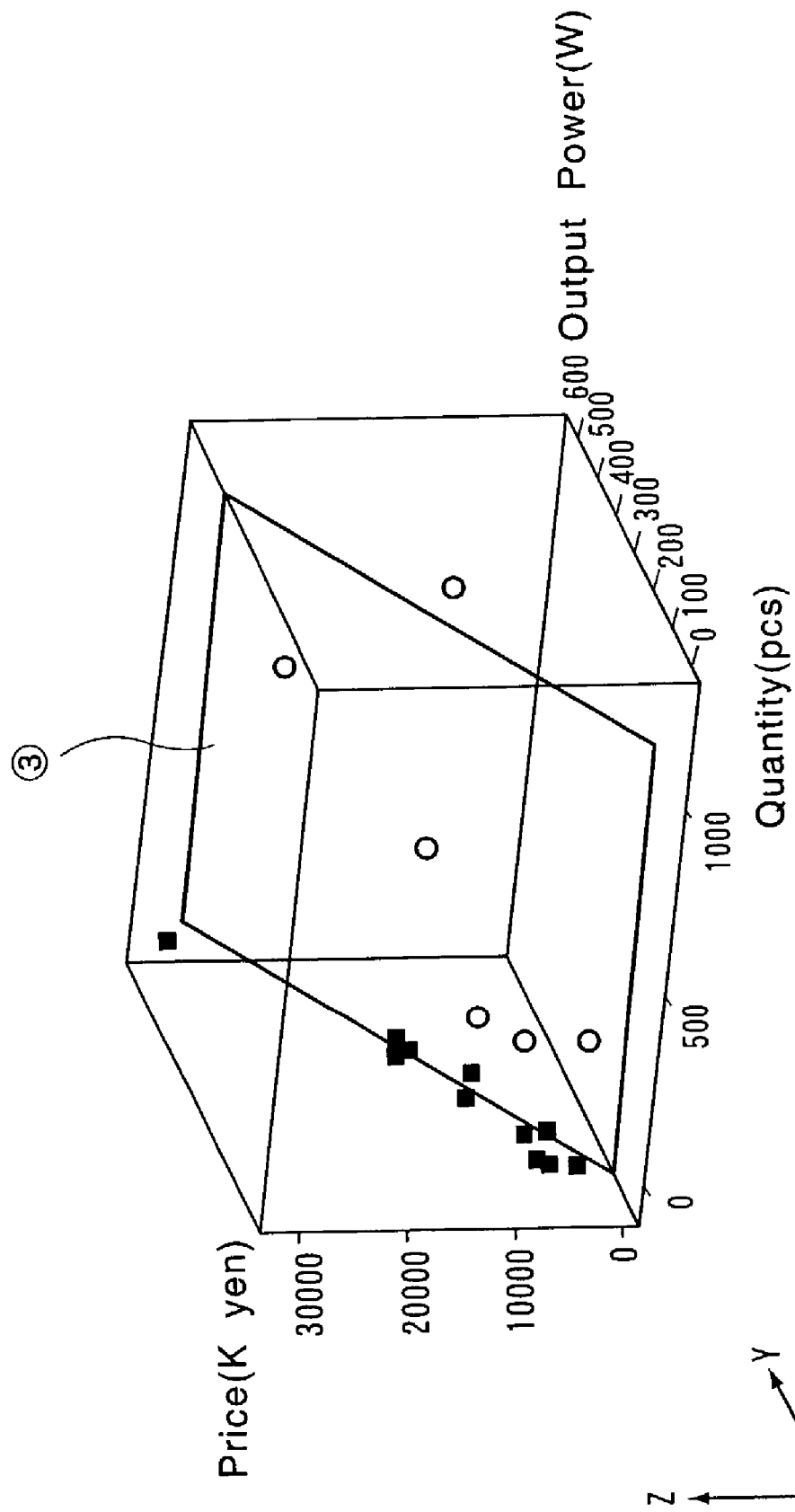
FIG. 8 is a three-dimensional chart showing an example of a correlation expression according to the second embodiment of the present invention.

FIG. 8 is a three-dimensional chart showing an example of the correlation expression mentioned above according to the second embodiment of the present invention. In FIG. 8, the X-axis represents quantity (pieces). The Y-axis represents a rating (output power (W)). And the Z-axis represents a price (a thousand yen). The correlation expression is represented by a plane ③. Each plot (■, ○) represents each parts data which has become a basis for obtaining the correlation expression. Plots placed above the plane ③ are represented with ■. Plots placed below the line ③ are represented with ○.

The bid/purchase determination processing section 2'-2 may determine to call for bids on parts represented with the plots above the plane ③. Here the plane ③ is a type of reference value for determining whether to call for bids or not. The plots above the line ③ are represented with the plots ■ in FIG. 8.

Further, the bid/purchase determination processing section 2'-2 gives a priority to each parts which are determined to be called for bids on. The priority may be given in the order of descending price reduction effect. Parts given a top priority may be called for bids, first.

When there is a limitation for the number of parts which can be called for bids, it may be effective to use such priorities when calling for bids on the limited number of parts. For example, it may be helpful for a company to treat the limited number of parts as an established reference number of how many parts can be called for bids each time. Further, for example, it may be helpful when the company establishes a threshold value where expected profit resulting from a cost reduction according to bidding responses is more than an amount represented with the threshold value in each parts, and decides to call for bids on only such profitable parts. Accordingly, the company can get the most out of the limited number of chances to call for bids on parts, and effectively achieve a cost reduction in the parts procurement. The reference number or the threshold may be determined in advance, or may be set and changed at any time with the input section 4 by the operator.

The price reduction effect may be calculated and obtained in the regression data-processing section 2'-1 as follows. For example, a multiple regression analysis by the regression data-processing section 2'-1 can be expressed in the following two-parameter multiple regression function.

$$Y(\text{calculated price by regression}) = FN(N) + F1(X1)$$

$FN(N)$: price-contributed function by purchase quantity (N)

F1(X1): price-contributed function for a material rating (X1) (e.g., motor's overall output power (W))

Further, a price divergence between a price Y1 calculated by regression and an actual purchase price Y2 may be defined as $\Delta Y$ That is, $\Delta Y = Y2 - Y1$.

In FIG. 8, values of the correlation expression represented on the plane ③ are the prices Y1 calculated by regression, and parts data expressed as plots are actual purchase prices Y2. Accordingly, the price divergence $\Delta Y$ can be a distance between a plot and the plane ③ in the Z axis direction.

Therefore, when an expected purchase quantity [N=((receipt of order oriented (or production oriented) quantity of one or more products requiring predetermined parts)−(stock quantity of the predetermined parts))] is calculated based on the receipt of order information and the production information, the prospective price reduction amount, W, may be obtained by $W = \Delta Y \times N$. This calculation can also be applied to calculations in the first embodiment of the present invention. In order to understand the above better, a more specific example will be described with a chart representing a correlation between functions (ratings) and prices as similar to FIG. 5. The following description may be applied commonly to the first and the second embodiments of the present invention.

Figure 9:
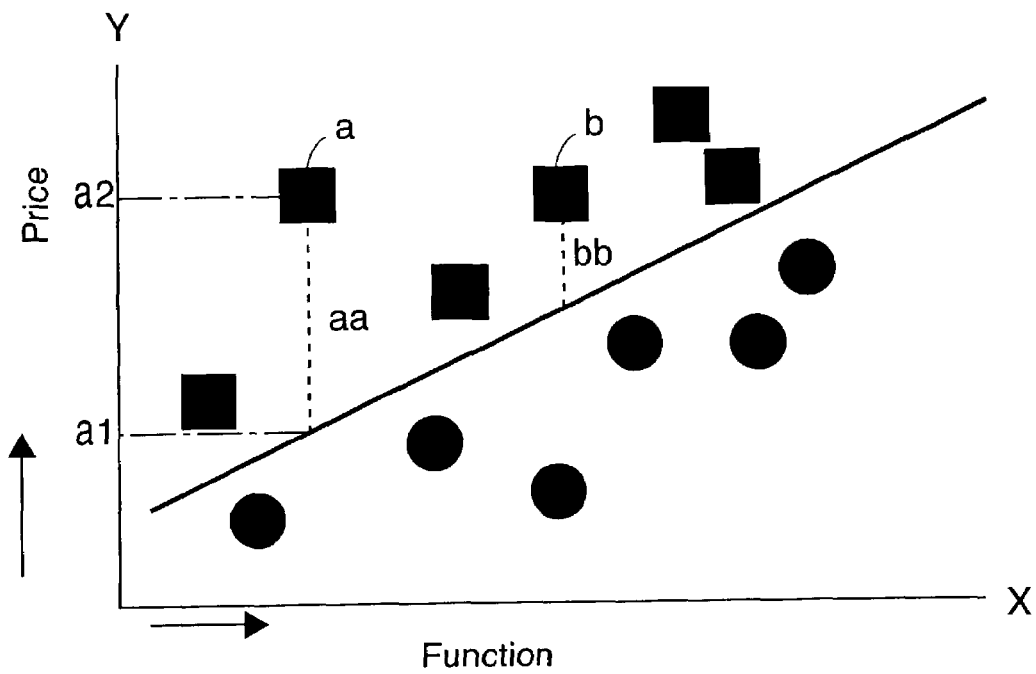
FIG. 9 is a chart showing another example of a correlation expression in an embodiment of the present invention.

FIG. 9 is a chart showing an example of the correlation expression prepared in the bid/purchase determination system 2, 2'. This chart is more simplified than FIG. 5. In FIG. 9, predetermined parts 'a' have an actual price a2. Here the parts 'a' may not be necessary to be particular parts but any parts satisfying a function or a specification (rating) described as 'a'. The price a2 of the parts 'a' has a divergence of aa from a price a1 on the correlation expression. The price divergence aa corresponds to $\Delta Y$ mentioned above. Similarly, regarding predetermined parts 'b', its price divergence is expressed as bb.

If the parts 'a' can be purchased at the price al (a fair price) obtained from the correlation expression, the purchase cost can be reduced aa per unit of the parts. When a prospective annual purchase quantity is Na, a prospective annual price reduction amount (an annual price divergence) Wa can be expressed as $Wa = aa \times Na$. Similarly, regarding the parts 'b', its prospective annual price reduction amount Wb can be expressed as $Wb = bb \times Nb$.

Figure 10:
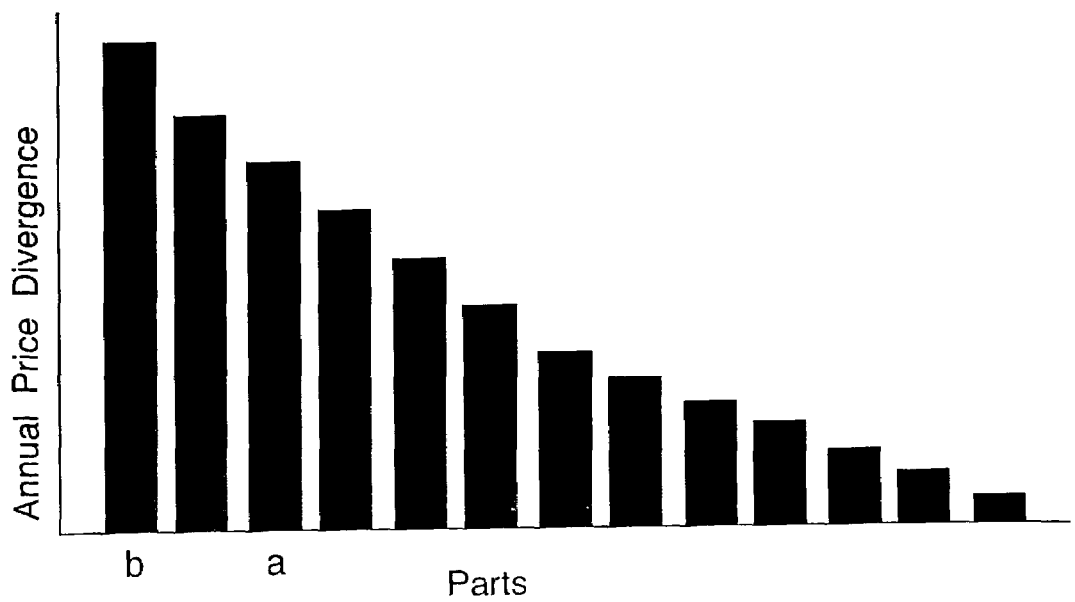
FIG. 10 is an example showing a relation between parts and their annual price divergences in an embodiment of the present invention.

Next, the price reduction effect will be explained with reference to FIG. 10. FIG. 10 is an example showing a relation between parts above the correlation expression in FIG. 9 and their annual price divergences. As explained in FIG. 9, when price divergences are compared with between the parts 'a' and the parts 'b' in each unit of parts, the divergence aa for the parts 'a' is larger than the divergence bb for the parts 'b' (aa>bb). For example, however, if the parts 'b' have a higher function (rating) than the parts 'a', the parts 'b' may be expected to be required and purchased more than the parts 'a' (Na<Nb). In this case, when each annual quantity is concerned, the annual price divergence Wb for the parts 'b' may exceed the annual price divergence Wa for the parts 'a' (Wa<Wb). For example, FIG. 10 shows that the parts 'b' has the largest annual price divergence among the all parts above the correlation expression in FIG. 9. The annual price divergence for the parts 'a' comes in third. Accordingly, one can see that to reduce the actual purchase price of the parts 'b' would contribute most to a whole purchase price reduction. Therefore, a top priority is given to the parts 'b'. The following priorities may be given to the rest of the parts in the order of each annual price divergence.

The bid/purchase determination processing section 2'-2 may give priorities to all the parts or the predetermined allowed number of the parts in the manner mentioned above. The bid/purchase determination processing section 2'-2 determines to call for bids on the parts in the order of descending priorities.

When there is a limitation for the number of parts which can be called for bids on, it may be effective to give such priorities to call for bids on the limited number of parts. For example, it may be helpful for a company to treat the limited number of parts as an established reference number of how many parts can be called for bids on each time. Further, for example, it may be helpful when the company establishes a threshold value where expected profit resulting from a cost reduction according to receipt of bidding is more than an amount represented with the threshold value in each parts, and decides to call for bids on only such profitable parts.

In the case of performing a more complicated multiple regression analysis, the above explained multiple regression function can be used with more parameters.

As explained above, the correlation expression is an element which directly influences the price divergence. When the correlation expression is different, the price divergence for each parts becomes different and this results in that each of the parts may be given a different priority. In FIG. 5, the reference value $\Delta$ has been explained as a reference that moves the original correlation expression in parallel. The original correlation expression can be used, but may also be modified or corrected in part.

Figure 11:
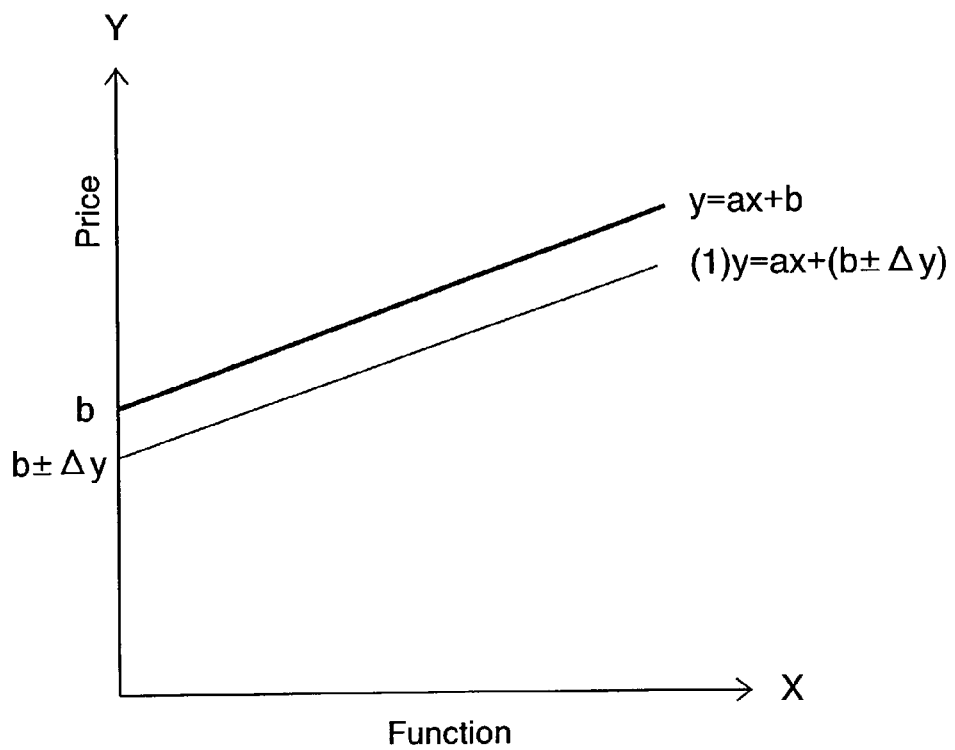
FIG. 11 is a first exemplary chart showing a correction of an original correlation expression in an embodiment of the present invention.
Figure 12:
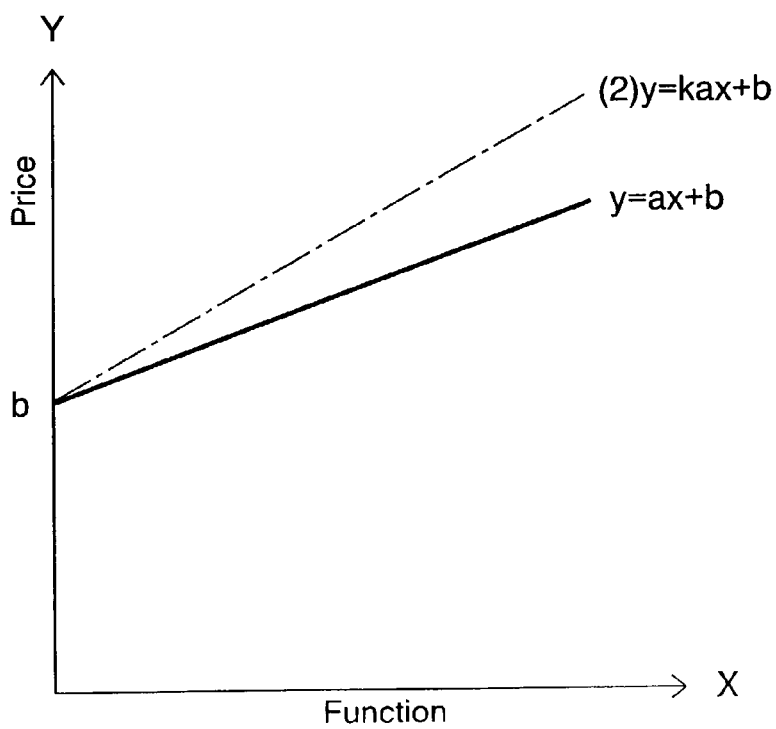
FIG. 12 is a second exemplary chart showing a correction of an original correlation expression in an embodiment of the present invention.
Figure 13:
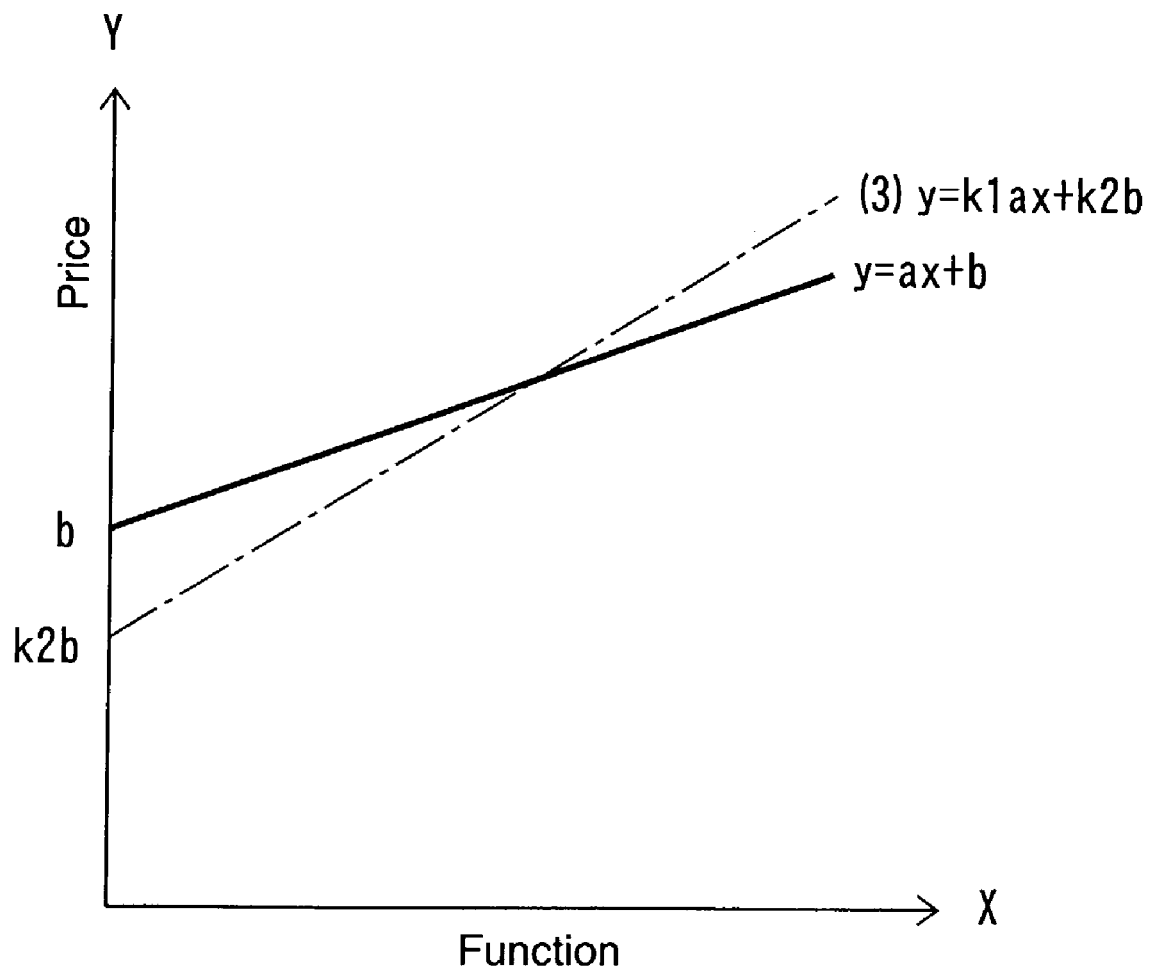
FIG. 13 is a third exemplary chart showing a correction of an original correlation expression in an embodiment of the present invention.

FIGS. 11 to 13 are exemplary charts showing corrections of an original correlation expression according to embodiments of the present invention. Plots of parts data are omitted in FIGS. 11 to 13. When, for example, the original correlation expression is expressed as $y = ax + b$, the following corrections may be conceivable for example.

(1): $y = ax + (b \pm \Delta y)$ (see FIG. 11)
(2): $y = kax + b$ (see FIG. 12)
(3): $y = k1ax + k2b$ (see FIG. 13)
  k, k1, k2: correction coefficients (reference values)

The above expression (1) is the same as that shown in FIG. 5. This correction may be based on an idea that the price reduction effect can be almost the same, regardless of functions' superiority. The correction by the above expression (2) may be based on an idea that the more expensive parts are, the higher the price reduction effect is. In practice, the above expression (3) which mixes up the above expressions (1) and (2) may be more appropriate for correcting the original correlation expression. However, if a correction for the gradient of the original correlation expression becomes major, the corrected expression may have a less relation with the original correlation expression and become irrelevant as a reference. Therefore, an excessive correction should be avoided.

Figure 14:
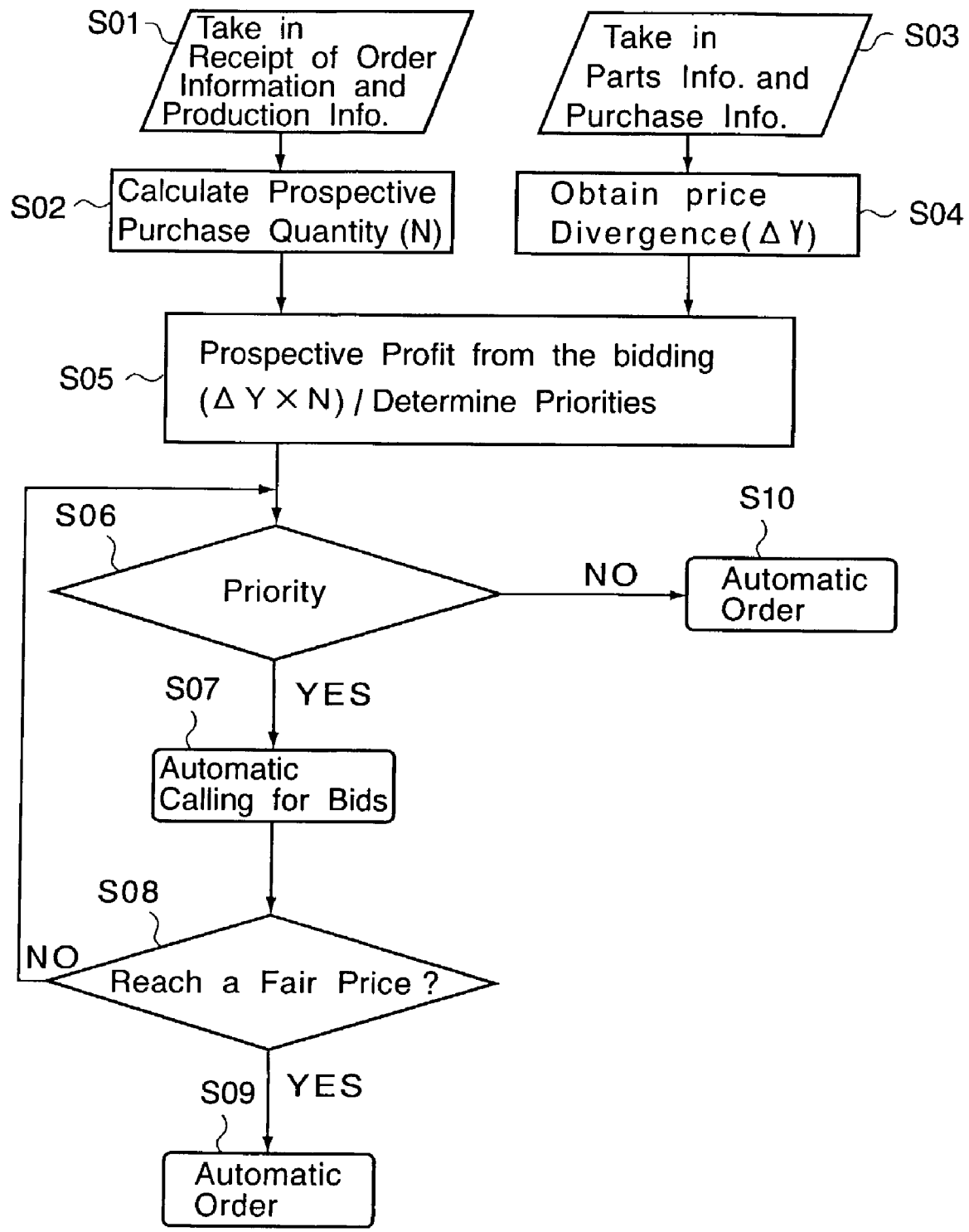
FIG. 14 is a flowchart showing exemplary procedures in a procurement system according to an embodiment of the present invention.

Exemplary procedures in embodiments of the procurement system will be described with reference to a flowchart shown in FIG. 14. The regression data-processing section 2'-1 takes in the receipt of order information from the receipt of order information server 1'-C and the production information from the production information server 1'-D, respectively (step S01). In the regression data-processing section 2'-1, the prospective purchase quantity (N) may be calculated from the receipt of order information and the production information (step S02). In addition, the regression data-processing section 2'-1 also takes in the parts information from the parts information server 1'-A and the purchase information from the purchase information server 1'-B, respectively (step S03). Also in the regression data-processing section 2'-1, the price divergence ($\Delta Y$) may be calculated and obtained from the parts information and the purchase information (step S04).

Further, the regression data-processing section 2'-1 calculates a prospective profit from the bidding ($\Delta Y \times N$) from the prospective purchase quantity (N) and the price divergence ($\Delta Y$). Based on the calculated result, the bid/purchase determination processing section 2'-2 determines the priorities for calling for bids on parts in the order of the prospective profit (step S05).

Once the priorities are determined, the bid/purchase determination processing section 2'-2 judges if parts have a higher priority (step S06). When the parts are judged to have a higher priority, the bid/purchase processing section 3'-1 automatically calls for bids on the parts (electronic bids) (step S07). Responsive to the bidding from the bid participants, it is determined whether the bidding price has reached a fair price (e.g., has become less than a price represented by the correlation expression) or not (step S08). When this determination is made, the bid/purchase processing section 3'-1 automatically orders the parts to a successful bidder (step S09). In this regard, when a plurality of bidders have participated in the bidding and still more than one bidder has presented fair prices, this case is knocked down or given to a bidder who has presented the lowest price among the bidders. The bid/purchase processing section 3'-1 automatically orders the parts to the bidder. When it is determined that it has not reached in step S08, this flow goes back to step S06 and the parts are called for bids on again. Further, when the bid/purchase determination processing section 2'-2 judges that the parts do not have a high priority, (so it may not be necessary to call for bids on them) in step S06, the bid/purchase processing section 3'-1 automatically orders the parts to a supplier, for example, from which the company usually purchase the parts (step S10).

According to the procurement system of the second embodiment of the present invention, as explained above, the collective determination of parts (determination of the correlation between functions, prices, and price reduction effect) is performed. As for a predetermined parts function (rating), parts which are more expensive than an optimal price (values represented by the correlation expression) may be automatically called for bids on in the order of the price reduction effect, and parts which are cheaper than the optimal price may be automatically purchased (ordered).

Third Embodiment

A procurement system according to a third embodiment of the present invention determines whether it calls for bids on series of parts and/or orders the series of parts to a parts supplier who can provide the series of parts. In this embodiment, a correlation expression may be calculated and obtained for each series of parts in supplier by supplier, in a similar manner to the first and the second embodiments of the present invention. Applying a case of the first embodiment to the third embodiment as an example, the details will be explained below.

(System Configuration)

Applying FIG. 1 correspondingly, a configuration of a procurement system according to a third embodiment of the present invention will be explained. FIG. 1 is a block diagram showing the procurement system according to the third embodiment of the present invention. As shown in FIG. 1, the procurement system mainly comprises a server 1, a bid/purchase determination system 2, a bid/purchase system 3, and an input section 4.

The server 1 may include a parts information server 1-A which stores and manages parts information and a purchase information server 1-B which stores and manages purchase information. The bid/purchase determination system 2 may include a bid/purchase determination information server 2-A which stores and manages bid/purchase determination information, a regression data-processing section 2-1 which performs regression data-processing based on the information stored in the server 1, and a bid/purchase determination processing section 2-2 which determines whether to bid or purchase based on a processing result by the regression data-processing section 2-1 and the information stored in the bid/purchase determination information server 2-A. The bid/purchase system 3 may include a bid/purchase information server 3-A which stores and manages bid/purchase information and a bid/purchase processing section 3-1 which automatically electronically calls for one or more bids on parts and performs purchase processing based on a determination result by the bid/purchase determination system 2 and the information stored in the bid/purchase information server 3-A. The input section 4 may include a keyboard and a mouse.

The above described systems and servers are connected with one another through the Internet. Further, the procurement system described above may also be connected, through the Internet Web, with parts suppliers A, B, C, and so on who may electronically participate in the bidding. Each parts supplier may, for example, be noticed a bidding chance by email or any other way in advance from an end of the procurement system and accordingly be able to participate in the bidding.

Applying FIG. 2 correspondingly, FIG. 2 is an example showing lists of information stored and managed in the server 1. As shown in FIG. 2, the parts information server 1-A may store and manage, for example, a product ID, a parts number, a parts group, a parts name, a manufacturer's name, a model name by the manufacturer, functional ratings (10 ratings or functions, for example), and the like, for each unit of parts. Such information may be input by the input section 4 to the parts information server 1-A. The purchase information server 1-B may store and manage, for example, a product ID, a parts number, a parts group, a parts name, a manufacturer's name, a model name by the manufacturer, a unit price, quantity, an order date, a due date, and the like, for each unit of parts. Such information may be collected from other system to the purchase information server 1-B.

Similarly, applying FIG. 3 correspondingly, FIG. 3 is an example showing a list of information stored and managed in the bid/purchase determination information server 2-A. As shown in FIG. 3, the bid/purchase determination information server 2-A may store and manage, for example, a product ID, a parts number, a parts group, a parts name, a manufacturer's name, a model name by the manufacturer, a unit price, quantity, a mathematical formula (e.g., (a price obtained by a regression formula)–$\Delta$), another mathematical formula (e.g., (a unit price)–((a price obtained by a regression formula)–$\Delta$)), bidding determination (threshold of Yes/No), bid suppliers' names, bid prices, a knock down supplier's name, a knock down price, and so on, for each unit of parts.

Still further, applying FIG. 4 correspondingly, FIG. 4 is an example showing a list of information stored and managed in the bid/purchase information server 3-A. As shown in FIG. 4, the bid/purchase information server 3-A may store and manage, for example, a product ID, a parts number, a parts name, ratings (10 ratings, for example), comments, bid suppliers' names, bid prices and the like, for each unit of parts.

(Method of Calling for Bids On and Purchasing Parts)

Next, procedures of calling for bids on series of parts and purchasing the series of parts in the procurement system according to the third embodiment of the present invention will be explained with reference to FIG. 15. First, the bid/ purchase determination system 2 performs processing for obtaining a correlation (a type of relation between one or more functions and prices) which becomes a basis to determine on which parts should be called for bids.

The regression data-processing section 2-1 takes in material parts information (ratings 1-10), which is important for determining a price, from the parts information server 1-A for each kind of parts, and takes in the price information of corresponding parts and the like from the purchase information server 1-B. To be specific, when a motor is taken as an example, data regarding an output (W) or a torque (Nm) may be taken in as the prime function (rating) and its price data may be taken in as the parts price information.

The regression data-processing section 2-1 performs conventional regression data processing. The regression data-processing section 2-1 calculates and obtains a correlation expression, by performing correlation analyses (such as a multiple regression, a single regression, and spline approximation) based on the above-mentioned data.

The above mentioned procedures will be explained more specifically below with an example of a direct current constant voltage power supply as the subject part.

The regression data-processing section 2-1 takes in data of the output power about the direct current constant voltage power supply as the material function information (ratings 1-10), and takes in its price data (as the price) and quantity information. Accordingly, the regression data-processing section 2-1 calculates and obtains an optimal correlation expression, by performing correlation analyses (such as a multiple regression, a single regression, and spline approximation) based on the taken in data.

Figure 15:
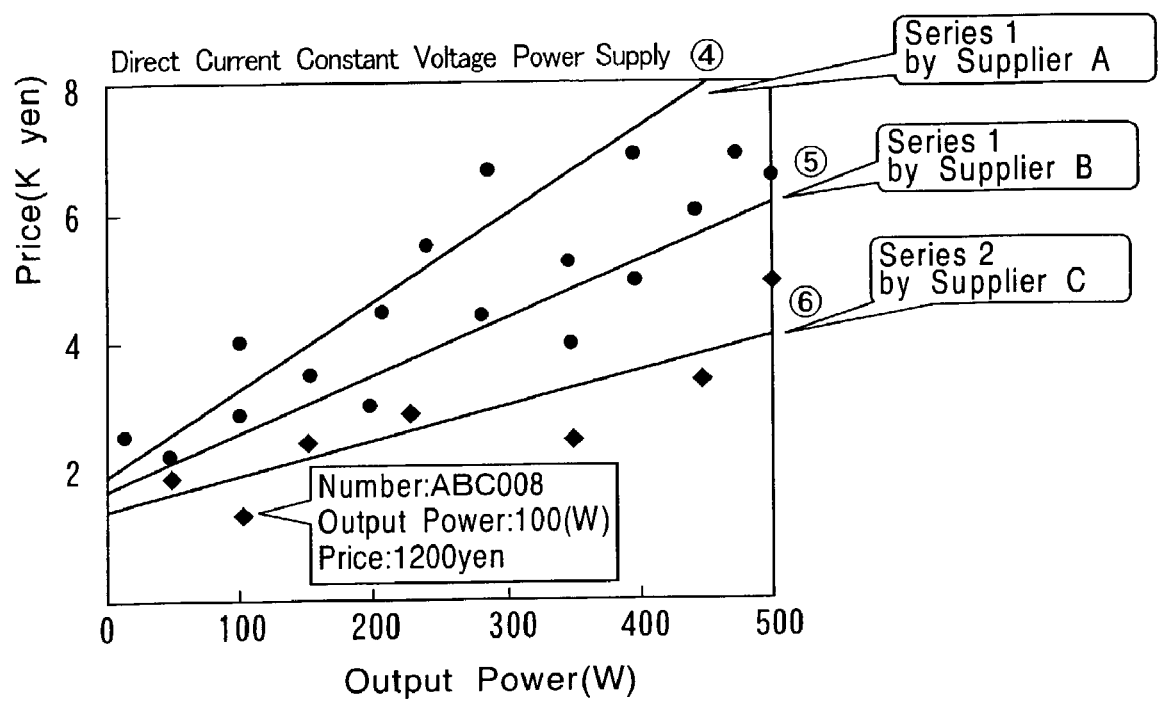
FIG. 15 is a chart showing an example of a correlation expression according to a third embodiment of the present invention.

FIG. 15 is a chart showing an example of the correlation expression according to the third embodiment of the present invention. In FIG. 15, a line ④ represents a correlation expression of a series 1 of parts by a parts supplier A from which a company, who calls for bids, currently purchases the series 1. Similarly, a line ⑤ represents a correlation expression of the series 1 of parts by a parts supplier B from which the company, who calls for bids, also currently purchases the series 1. The bid/purchase determination processing section 2-2 sends information of parts (e.g., ratings 1 to 10) included in the series 1 by the parts supplier A and information of parts (e.g., ratings 1 to 10) included in the series 1 by the parts supplier B, to the bid/purchase system 3 so as to call for bids on the series (not each parts). The bid/purchase system 3 which received the information from the bid/purchase determination processing section 2-2 calls for bids on the series of parts. Each of the parts suppliers A, B, and C, may participate in such bidding through the Internet.

When the procurement system calls for bids on the series of parts, a result of bidding by the parts suppliers A, B, and C may be reported to the bid/purchase processing section 3-1. An example of the bidding report is shown in FIG. 15. A line ⑥ represents a correlation expression resulting from the bidding response from parts supplier C. As this example shown in FIG. 15, the bidding results ♦ may be displayed together with a chart based on the correlation expression.

The bid/purchase processing section 3-1 compares the correlation expressions ((④-⑥)) of the parts suppliers A, B, and C with one another, and determines to knock down or select the parts supplier C since the correlation expression of the parts supplier C has presented that the series 2 (which also meets the requested ratings) can be purchased at the lowest price among the parts suppliers A, B, and C determining from a series point of view. The bid/purchase processing section 3-1 orders the series of parts 2 presented in the bidding to the parts supplier C.

According to the procurement system of the third embodiment of the present invention, as explained above, the collective determination of series of parts (determination of the correlation between functions and prices regarding series of parts by each parts supplier) is performed. As for a predetermined parts function (rating), according to a result of the comparison determination, the series of parts may be automatically purchased (ordered).

Further, in the embodiments of the present invention, the procurement system may have a random access memory (RAM), which can receive and store computer programs and applications as computer readable instructions in a temporary and/or non-volatile state. The procurement system may further have a hard disk drive for reading from and writing to a hard disk, a magnetic disk drive for reading from and writing to a magnetic disk, and/or an optical disk drive for reading from and writing to an optical disk (such as a CD, CDR, CD-RW, DVD, or other optical device). Those skilled in the art will appreciate that one or more of such memory, drives, and their respective media are examples of a computer program product for storing computer readable instructions, which when executed, may implement an embodiment of the present invention.

The embodiments of the present invention described above are examples described only for making it easier to understand the present invention, and are not described for the limitation of the present invention.

Consequently, each component and element disclosed in the embodiments of the present invention may be redesigned or modified to its equivalent within a scope of the present invention.

What is claimed is:

1. A computer implemented evaluating system for bidding and purchasing a desired component, the system comprising:
   a storage configured to store information on each of prices and quantities, and rated values of a plurality of subject components;
   an input section configured to input a rated value of the desired component;
   a correlation calculation processor configured to calculate a correlation between each of the prices and the rated values on the plurality of subject components based on the stored information in the storage;
   a judging base setting processor configured to set a judging base for bidding or purchasing the desired component by subtracting the rated value of the desired component inputted though the input section from the correlation calculated by the correlation calculation processor;
   a determining processor configured to determine a necessity of bidding for purchasing the desired component; and,
   a deciding processor configured to decide a bidding or a purchasing order of the desired component based on the necessity of bidding for purchasing the desired component by the determining processor wherein the correlation represents a correlation expression based on a regression data processing.

2. The system according to claim 1, wherein the quantity is a prospective quantity for purchasing each of the at least one of the subjects.

3. The system according to claim 1, further comprising an ordering processor configured to automatically order an alternative one of the subjects other than the desired component.

4. The system according to claim 1, further comprising an ordering processor configured to automatically order, when there are a plurality of biddings for the desired component, from one of the bidding participants who bids at a lowest of the biddings.

5. The system according to claim 1, wherein the rated values are correctable.

6. The system according to claim 1, wherein the storage further stores information about receiving an order for a product requiring at least one of the subjects.

7. The system according to claim 1, wherein the storage further stores information regarding production of a product requiring at least one of the subjects.

8. The system according to claim 1, wherein the subjects comprise one or more series of subjects.

* * * * *